United States Patent
Miyashita et al.

(10) Patent No.: US 7,047,732 B2
(45) Date of Patent: May 23, 2006

(54) OUTBOARD ENGINE EXHAUST STRUCTURE

(75) Inventors: Yasushi Miyashita, Hamamatsu (JP); Jiro Saiga, Hamamatsu (JP); Katsuhiro Fukuda, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 324 days.

(21) Appl. No.: 10/236,038

(22) Filed: Sep. 4, 2002

(65) Prior Publication Data

US 2003/0041595 A1 Mar. 6, 2003

(30) Foreign Application Priority Data

Sep. 4, 2001 (JP) .................................... 2001-267439

(51) Int. Cl.
 F01N 7/10 (2006.01)

(52) U.S. Cl. .......................................................... 60/323
(58) Field of Classification Search .................. 60/321, 60/323; 440/89 C, 88 J
See application file for complete search history.

(56) References Cited

U.S. PATENT DOCUMENTS 5,388,555 A  2/1995  Shiomi et al.
5,613,470 A * 3/1997  Shiomi et al. ........... 123/195 P
5,704,819 A  1/1998  Isogawa
5,822,985 A * 10/1998  Yoshimura .................... 60/302
5,855,495 A * 1/1999  Kubo ....................... 440/89 R
5,893,783 A  4/1999  Hiraoka et al.
6,186,846 B1 * 2/2001  Takayanagi ............... 440/89 R
6,511,356 B1 * 1/2003  Yukishima ................... 60/323

FOREIGN PATENT DOCUMENTS

JP  09-041934  2/1997
JP  2000-310108  11/2000

* cited by examiner

Primary Examiner—Thomas Denion
Assistant Examiner—Diem Tran
(74) Attorney, Agent, or Firm—Darby & Darby

(57) ABSTRACT

An exhaust structure for use in an outboard engine of a vertical-type four-cycle V-type having cylinder heads, a crankcase, cylinder blocks constituting left and right sides of an integral body disposed in a V shape as seen in a plan view and forming a V-bank therebetween, an intake system disposed in the V bank, exhaust systems disposed on the left and right sides outside the V-bank, and a crankshaft disposed substantially vertically to the surface formed where the crankcase and cylinder blocks join one another, wherein the engine is disposed above an engine support attached to the hull and an oil pan is disposed beneath the engine support. The exhaust systems join and become integral inside the engine support and then pass through the interior of the oil pan to discharge exhaust gases. The invention provides an outboard engine exhaust structure having a non-complex oil pan of sufficient capacity.

24 Claims, 9 Drawing Sheets

OUTBOARD ENGINE EXHAUST STRUCTURE

BACKGROUND OF THE INVENTION

1. Field of the Invention

The present invention relates to exhaust structures for an outboard V-type engine.

2. Description of the Related Art

Japanese Patent Application Laid-Open No. 12-310108 discloses exhaust structures for four-cycle outboard engines. An exhaust pipe extends downward from the undersurface of the front side of the mounting case of the engine, and an oil pan is disposed to the rear of this exhaust pipe. A disadvantage of this structure is that the exhaust pipe is a separate part, and thus, the required number of parts and assembly labor are increased. The structure is also complicated. Further, because the space in front of the oil pan is occupied by the exhaust pipe, the capacity of the oil pan is reduced.

Japanese Patent Application Laid-Open No. 9-41934 discloses a structure in which the exhaust pipe is integrally disposed inside the oil pan. This simplifies the structure, reduces the number of parts, and reduces labor required for assembly. However, the shape of the oil pan itself is complicated in that two exhaust pipes pass through the oil pan. Additionally, the capacity of the oil pan is reduced.

SUMMARY OF THE INVENTION

The present invention provides an exhaust structure in which the shape of the oil pan is simplified and the capacity of the oil pan is not diminished.

The exhaust structure of the invention may be used in a vertical-type four-cycle V-type outboard engine. The engine may include a crankcase, cylinder blocks constituting left and right sides of an integral body disposed in a V-shape as seen in a plan view and forming a V-bank therebetween, and cylinder heads. An intake system may be disposed in the V-bank, and exhaust systems may be disposed on the left and right sides outside the V-bank. A crankshaft may be disposed substantially vertically to a surface formed where the crankcase and cylinder blocks join one another. The engine may be disposed above an engine support attached to the hull, and an oil pan may be disposed beneath the engine support. The exhaust systems join and integrate with one another inside the engine support and then pass through the interior of the oil pan to discharge exhaust gases.

The engine support has an exhaust collecting passage comprising two exhaust inlets, one each located in the left and rights sides of the engine support, respectively, and a generally centralized exhaust outlet. The exhaust inlets extend from openings in the respective side surfaces of the engine support and are connected by exhaust manifolds to exhaust ports that extended toward the outside surfaces of the left and right cylinder heads.

The exhaust inlets may be configured to join in approximately the center of the engine support and communicate with the exhaust outlet.

The exhaust inlets may also respectively extend perpendicularly to the axes of the left and right cylinder banks.

The exhaust inlets may further extend obliquely rearward as seen in a plan view.

The exhaust structure may further comprise a final exhaust passage that communicates with the exhaust outlet and is substantially centered in the oil pan.

In addition, the area surrounding the engine may be covered by an engine cover configured such that the engine cover, cylinder blocks and cylinder heads define triangular spaces therein, and the exhaust manifolds may be located in the spaces.

DESCRIPTION OF EMBODIMENTS OF THE INVENTION

Embodiments of the present invention will be described below with reference to the abovementioned figures.

Figure 1:
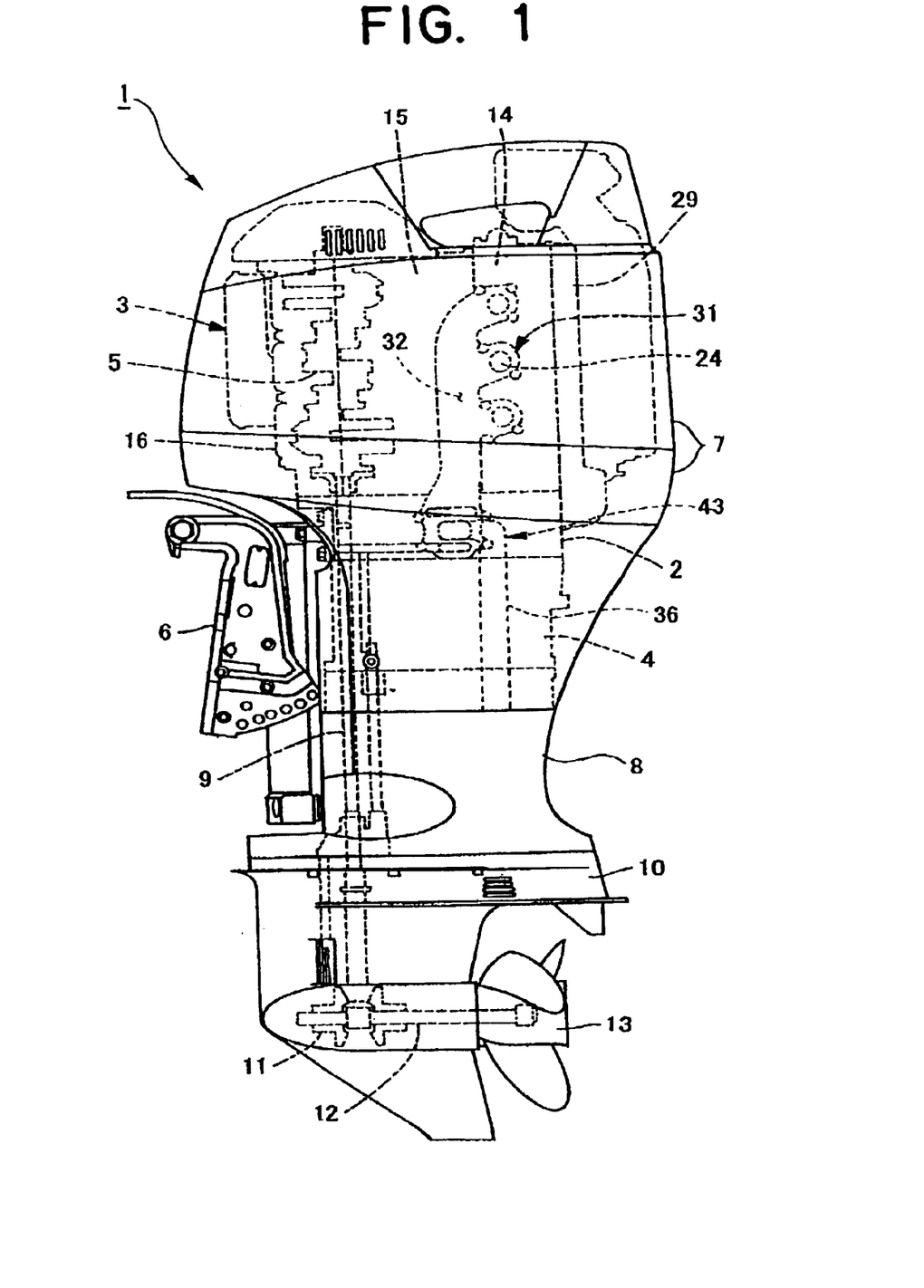
FIG. 1 is a left-side view of an outboard engine having an exhaust structure according to an embodiment of the present invention.

FIG. 1 shows one example of an outboard engine in which an exhaust structure of the present invention is used. The left side of the figure is toward the front (hull side), and the right side is toward the rear.

An outboard engine 1 is equipped with an engine support 2. An engine 3 is disposed above the engine support 2, and an oil pan 4 that stores lubricating oil (not shown in the figures) is disposed beneath the engine support 2. The engine 3 is a vertical type engine in which a crankshaft 5 is disposed substantially vertically inside the engine.

A pair of left and right tubular engine mounts (described below) are disposed in the vicinity of the front edge of the engine support 2, and the front ends of the left and right engine mounts may be connected to a clamp bracket. The clamp bracket 6 may be fastened to the transom of a hull (not shown in the figures). Furthermore, the area around the engine 3, engine support 2, and oil pan 4 is covered by an engine cover 7.

A shaft housing 8 is disposed at the area around the lower part of the oil pan 4. A drive shaft 9 which is the output shaft of the engine 3 is disposed substantially vertically inside the engine support 2, oil pan 4 and shaft housing 8. The upper end portion of this drive shaft 9 is connected to the lower end portion of the crankshaft 5. The drive shaft 9 extends downward through the shaft housing 8 and is constructed so that this drive shaft 9 drives a propeller 13 (constituting a propulsion device) via a bevel gear 11 inside a shaft crankcase 10 disposed at the area of the lower part of the shaft housing 8, and a propeller shaft 12.

Figure 2:
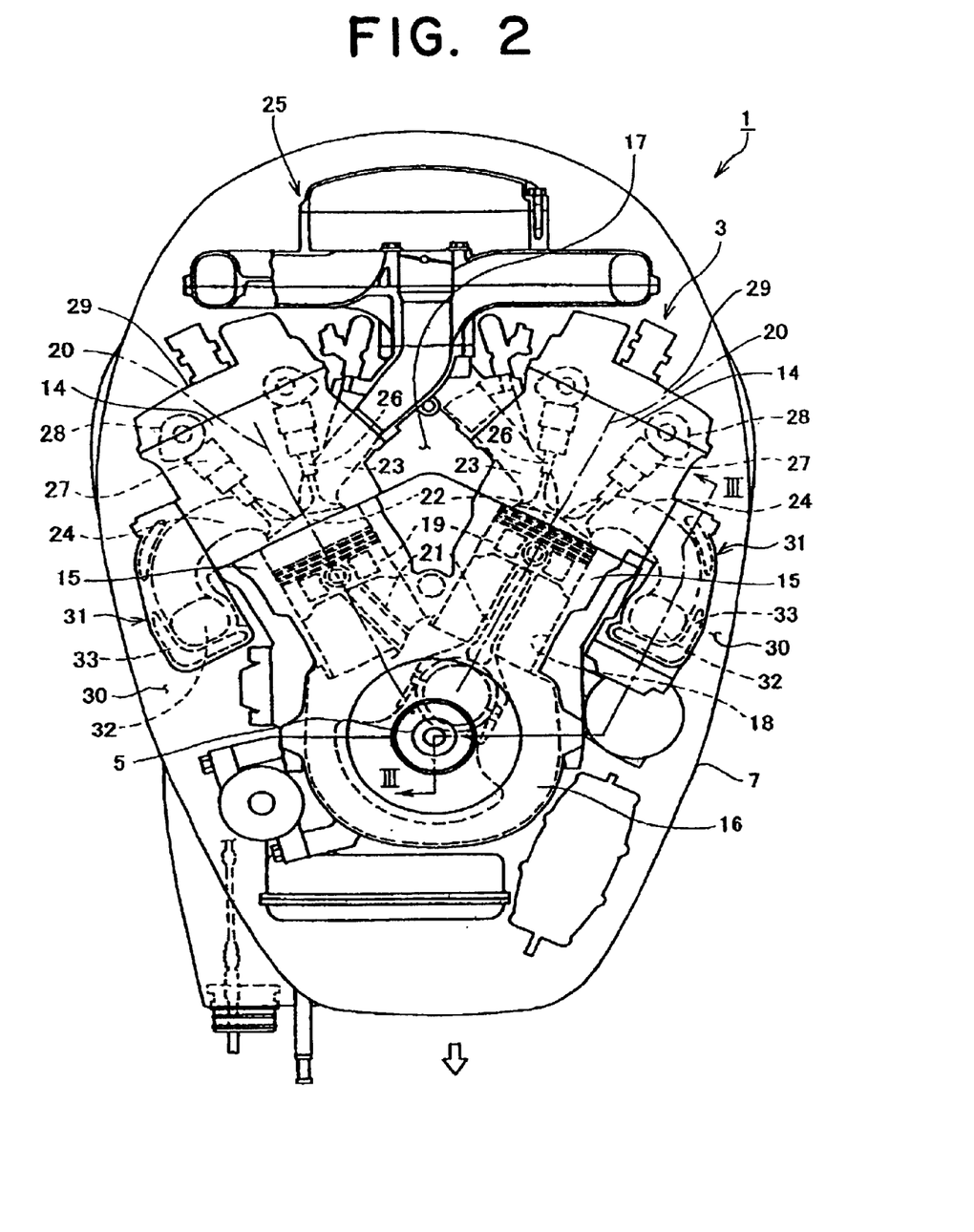
FIG. 2 is a plan view of the engine of FIG. 1.

FIGS. 1 and 2 illustrate that the engine 3 may be a four-cycle V-type six-cylinder engine which is constructed by combining, for example, cylinder heads 14, cylinder blocks 15, a crankcase 16, and other typical components of such an engine.

Left and right integrated cylinder blocks 15 are disposed in a V shape that spreads in the direction of width of the outboard engine 1 (as seen in a plan view) to the rear (right side of FIG. 1 and lower side of FIG. 2) of the crankcase 16, which is disposed on the foremost part of the engine 3 (i.e., furthest to the left in FIG. 1 and top side of FIG. 2), so that a V-bank 17 is formed between the cylinder blocks 15. A cylinder head 14 is disposed to the rear of each cylinder block 15.

Three cylinders 18 are located in a substantially in-line configuration so that these cylinders are positioned adjacent to each other in the vertical direction inside each cylinder block 15 (details of this configuration are not shown in the figures). A piston 19 is inserted in each cylinder 18 and is free to slide along the axis 20 of its cylinder 18.

The crankshaft 5 and pistons 19 are connected by connecting rods 21, so that the reciprocating strokes of the pistons 19 are converted into rotational motion of the crankshaft 5. The crankshaft 5 is disposed in a vertical orientation to a surface formed where the crankcase 16 and cylinder blocks 15 join.

Combustion chambers 22 are aligned with the cylinders 18 and are located in the cylinder heads 14, as are spark plugs (not shown in the figures), which are connected in communication to outside the engine 3. Intake ports 23 and exhaust ports 24 that communicate with the combustion chambers 22 are located within the cylinder heads 14. The exhaust ports 24 extend to the outside surfaces of the left and right cylinder heads 14, while the intake ports 23 extend to the interior of the V-bank 17 and are connected to an intake system apparatus 25 disposed therein.

Intake valves 26 and exhaust valves 27 that open and close the ports 23 and 24 are disposed inside the respective cylinder heads 14. Two valve driving cam shafts 28 (one for the intake valves and one for the exhaust valves) that open and close valves 26 and 27 are disposed parallel to the crankshaft 5 towards the rear of the respective cylinder heads 14. The cylinder heads 14 are covered by cylinder head covers 29.

Exhaust manifolds 31 which are an exhaust system are disposed inside triangular spaces 30 located on and bounded by the outside of the crankcase 16, cylinder blocks 15 and cylinder heads 14 (located outside the V bank 17) and on the inside of the engine cover 7. The upper ends of the exhaust manifolds 31 are connected to the exhaust ports 24, and the lower ends of the exhaust manifolds 31 are separately connected to the left and right side surfaces of the engine support 2.

Figure 3:
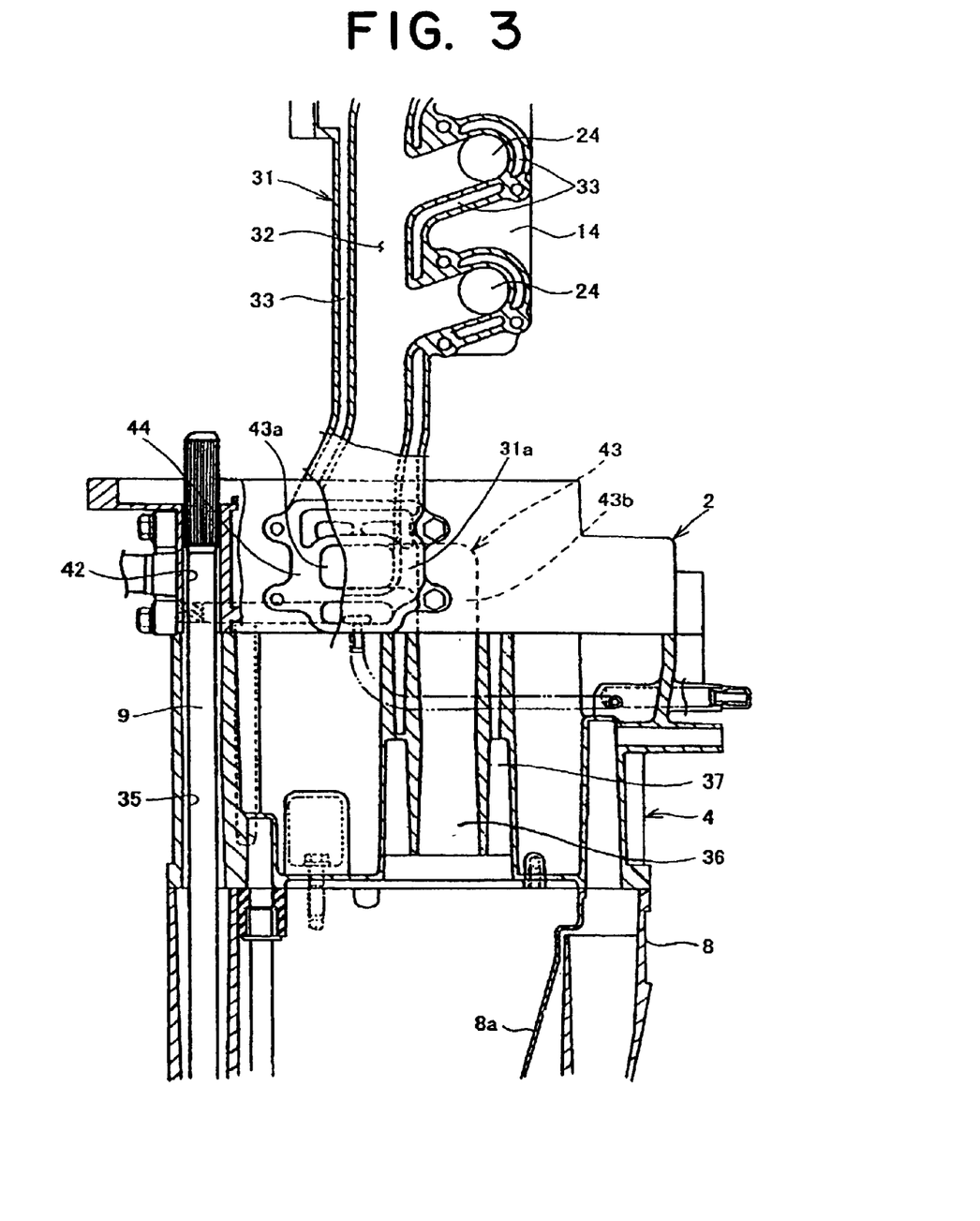
FIG. 3 is a longitudinal sectional view along line III—III of FIG. 2.

Referring now to FIG. 3, the exhaust manifolds 31 include a primary exhaust collecting passage 32 in which the exhaust gas from the cylinders on one side of the engine 3 is collected, and a cooling water jacket 33 surrounding this passage 32. Although details are not shown in the figures, the cooling water jackets 33 communicate with the region of the V-bank 17 of the engine 3.

Figure 4:
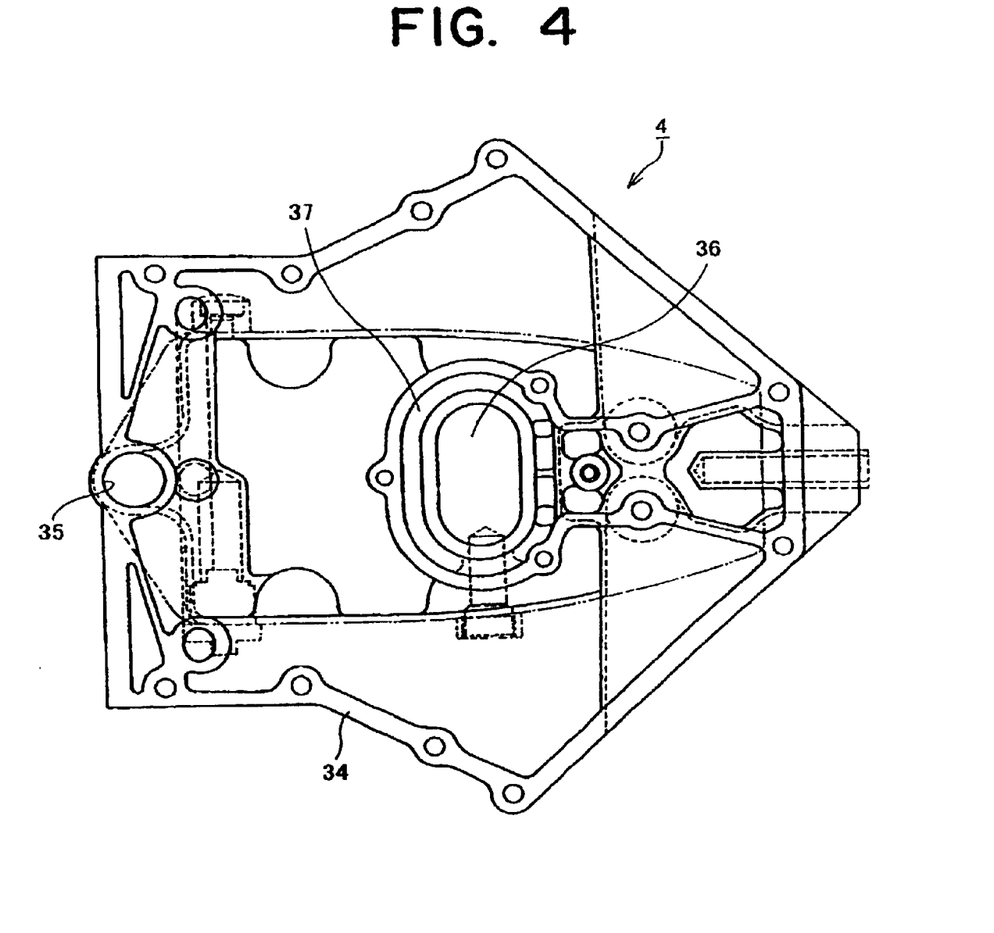
FIG. 4 is a plan view of oil pan according to an embodiment of the present invention.
Figure 5:
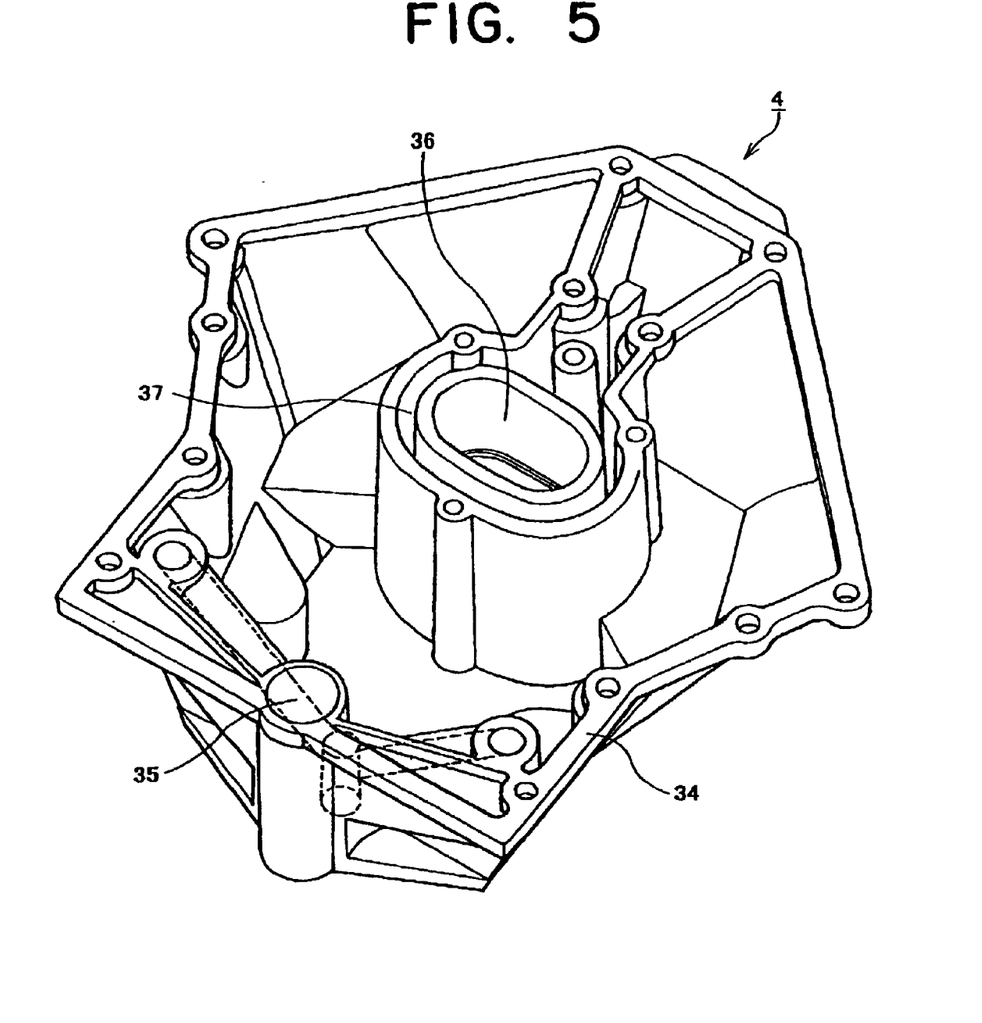
FIG. 5 is a top-left perspective view of the oil pan of FIG. 4.
Figure 6:
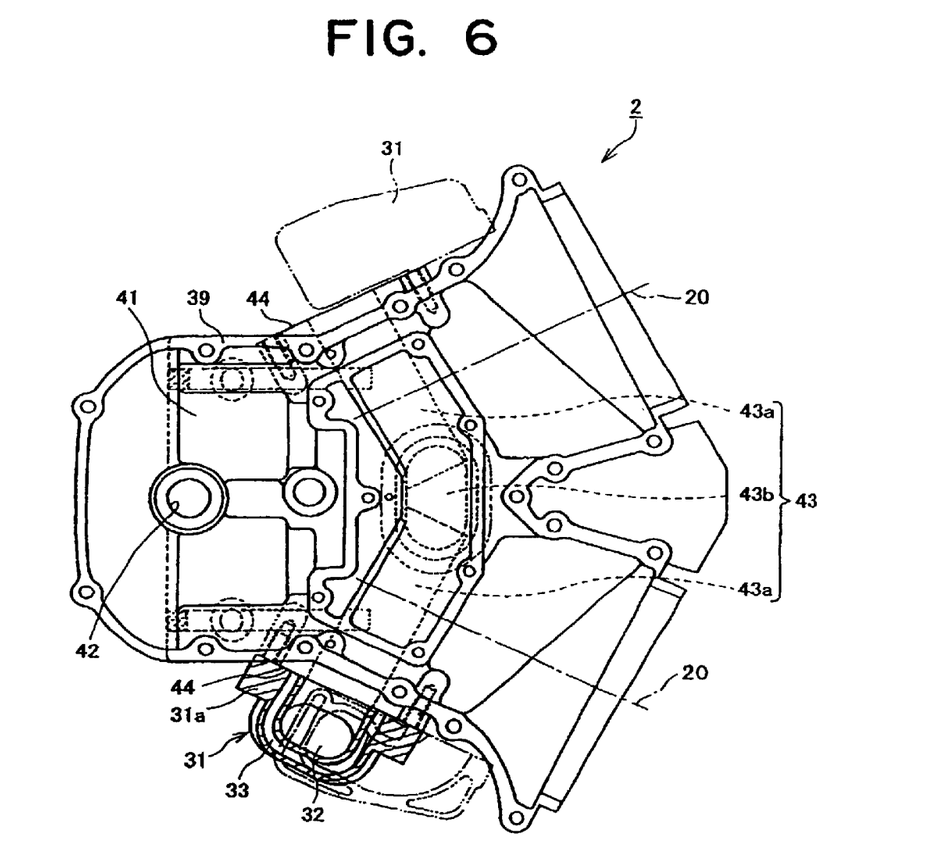
FIG. 6 is a plan view of an engine support according to an embodiment of the present invention.
Figure 7:
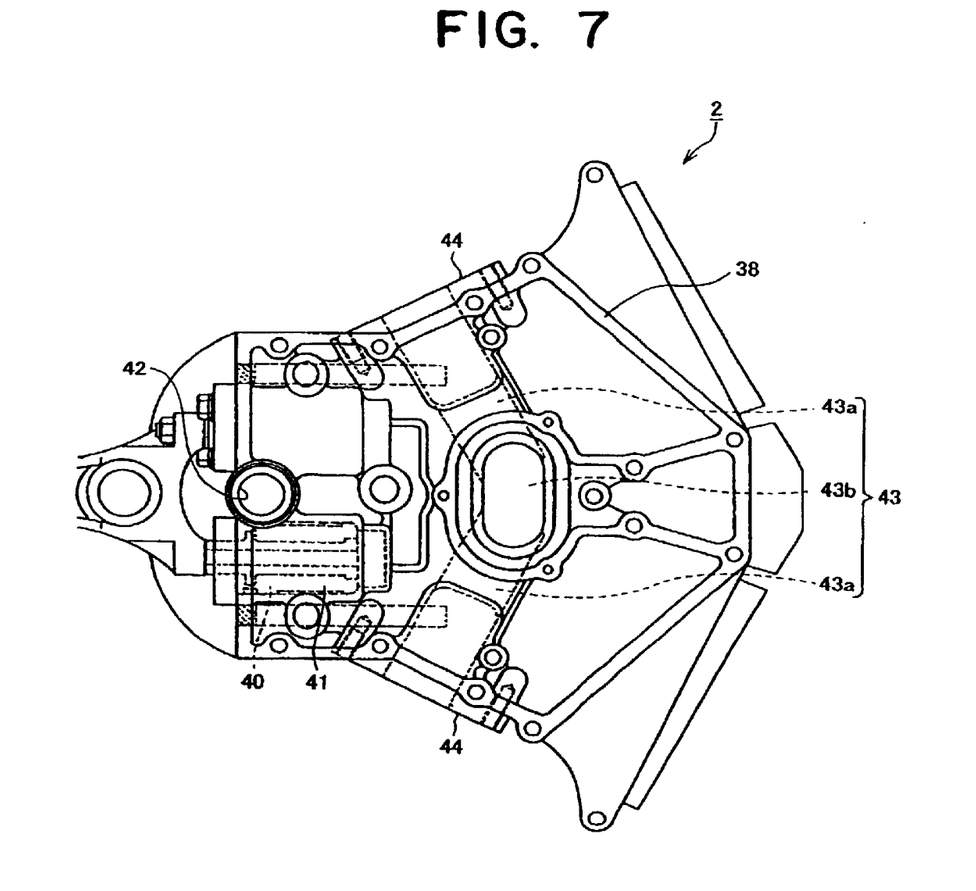
FIG. 7 is a bottom view of an engine support according to an embodiment of the present invention.
Figure 8:
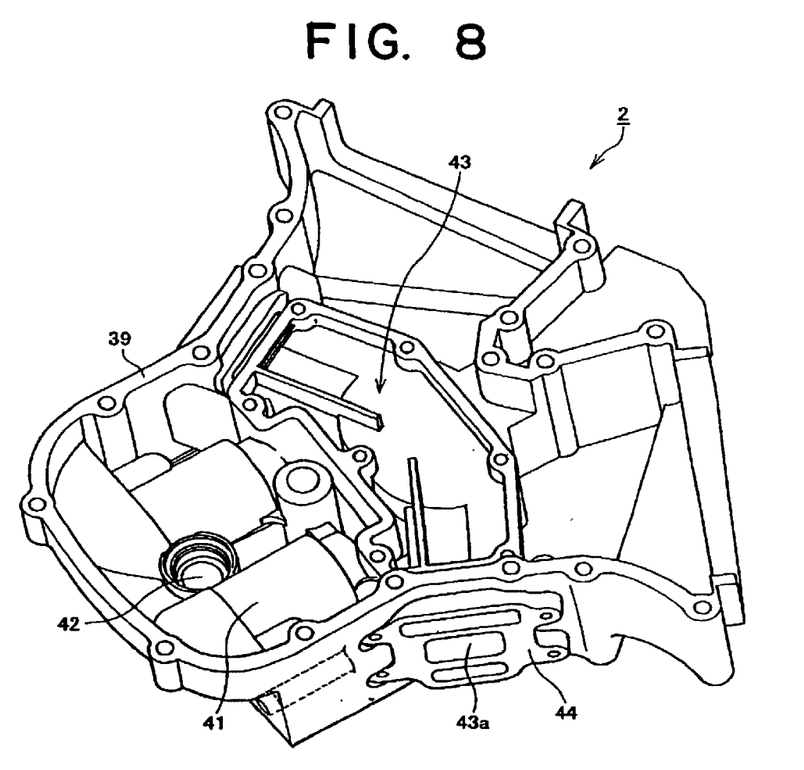
FIG. 8 is a top-left perspective view of the engine support of FIG. 6.
Figure 9:
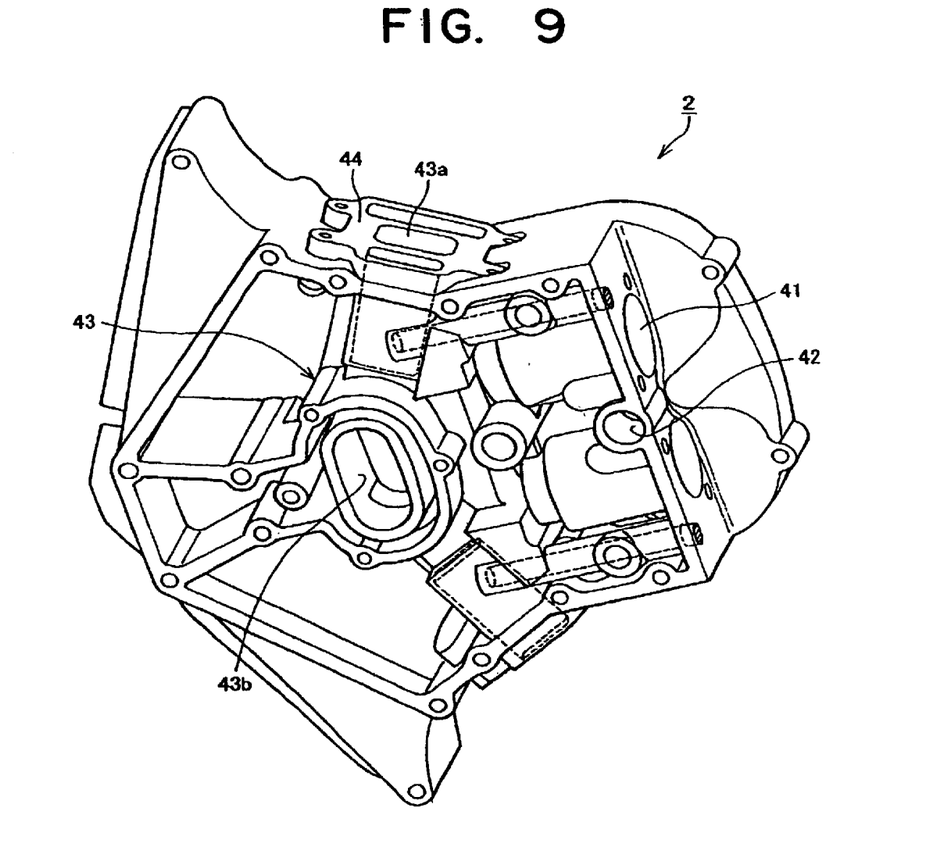
FIG. 9 is a bottom-right perspective view of the engine support of FIG. 8.

Referring further to FIG. 4 and FIG. 5, the oil pan 4 is a vessel with a bottom and an open top to store oil. A flat joint surface 34 located on the system surface of the oil pan 4 may be joined in a liquid-tight manner to the bottom surface of the engine support 2. The oil pan 4 has an upper drive shaft insertion hole 35 shaped as a through-hole through which the drive shaft 9 is passed. The upper drive shaft insertion hole 35 is located in the front of the oil pan 4, and a well-shaped final exhaust passage 36 is located in approximately the central portion of the oil pan 4. Moreover, a cooling water jacket 37 is located to surround the final exhaust passage 36.

Referring next to FIGS. 6–9, a lower joint surface 38 on the undersurface of the engine support 2 is joined in a liquid-tight manner to the flat joint surface 34 of the oil pan 4. The undersurface of the engine 3 is joined in a liquid-tight manner to an upper joint surface 39 on the upper surface of the engine support 2. The tubular engine mounts 40 are located inside a pair of left and right mount receptacles 41 configured so as to open at the front surface of the engine support 2.

A lower drive shaft insertion hole 42 is located between the left and right mount receptacles 41, and the drive shaft 9 passes there through. A secondary exhaust collecting passage 43 is located to the rear of the insertion hole 42.

The secondary exhaust collecting passage 43, having exhaust inlets on the left and right sides and a single central exhaust outlet 43b, is formed as a substantially T-shaped passage (not shown in the figures) as viewed in the forward-rearward direction of the engine. The left and right exhaust inlets 43a extend respectively obliquely rearward as seen in a plan view, perpendicularly to the axes 20 of the left and right cylinders 18, and converge in a central area of the engine support 2 to communicate with the exhaust outlet 43b. The left and right exhaust inlets 43a open to (and may extend from) the central portions of flat manifold joint surfaces 44 on the left and right side surface of the engine support 2. The exhaust outlet 43b opens (and may extend from) about a central area of the undersurface of the engine support 2.

Connecting flanges 31a on the lower ends of the respective exhaust manifolds 31 are joined to each manifold joint surface 44. The primary exhaust collecting passages 32 inside the exhaust manifolds 31 are configured to be generally aligned with the exhaust inlets 43a, so that the primary exhaust collecting passages 32 and secondary exhaust collecting passage 43 communicate with each other. The exhaust outlet 43b is generally aligned with the final exhaust passage 36 of the oil pan 4.

Accordingly, the exhaust gases discharged from both cylinder heads 14 of the V-type engine 3 pass through the exhaust manifolds 31 (primary exhaust collecting passages 32) and are collected by the secondary exhaust collecting passage 43. The exhaust gases are then released from the final exhaust passage 36 into an inner housing 8a (see FIG. 3) located inside the shaft housing 8. Here, the exhaust gases expand and are discharged into the water after the sound has been muffled.

The present invention has a number of benefits over known exhaust structures. For example, as the exhaust system of an V-type engine 3 is divided into left and right parts, it is necessary to attach respective exhaust manifolds 31 to the left and right cylinder heads 14. In the present invention, a configuration is used in which the exhaust systems of the exhaust manifolds 31 resulting from the division into two parts (i.e., the primary exhaust collecting passages 32) are gathered or converge (into the secondary exhaust collecting passage 43) inside the engine support 2. Exhaust gases are discharged through the oil pan 4 following this integration. Accordingly, the shapes of the engine support 2 and oil pan 4 are less complex than known systems, and only a single exhaust system (i.e., the final exhaust passage 36) is located in the oil pan 4, so that the capacity of the oil pan 4 may be sufficiently maintained.

Furthermore, the intake system 25 is disposed on the inside of the V-bank 17 while the exhaust manifolds 31 are disposed on the outside. When the manifold joint surfaces 44 are formed on the side surfaces of the engine support 2, the attachment of the exhaust manifolds 31 is easier, and the flow of the exhaust gases is linear and smooth.

Additionally, the left and right exhaust inlets 43a that form the secondary exhaust collecting passage 43 extend obliquely rearward as seen in a plan view, in directions that are perpendicular to the axes 20 of the left and right cylinders 18 and converge in the center of the engine support 2. Accordingly, the exhaust inlets 43a communicate with the exhaust outlets 43b. Thus, they do not interfere with other parts such as the pair of left and right mount receptacles 41 and the lower drive shaft insertion hole 42.

Also, because the final exhaust passage 36 is located in a central area of the oil pan 4, the shape of the oil pan may be more flexible without compromising the amount of lubricating oil that can be accommodated therein.

Finally, by locating the exhaust manifolds 31 inside the triangular spaces 30, dead space is efficiently utilized.

What is claimed is:

1. An outboard engine exhaust structure in an outboard engine comprising:
    (a) a vertical type four-cycle V-type engine which has cylinder heads, cylinder blocks and a crankcase, and in which a V bank having a left and a right outer sides is formed between said cylinder blocks by disposing said cylinder blocks constituting an integral body on the left and right sides so as to define a V shape as seen in a plan view,
    (b) an intake system disposed inside said V bank,
    (c) exhaust systems disposed at said left and right outer sides of said V bank, and
    (d) a crankshaft disposed substantially vertically at the joint surface between said crankcase and said cylinder blocks;
    (e) an engine support adapted to be attached to a hull, above which said engine is disposed and
    (f) an oil pan disposed beneath said engine support;
    wherein said left and right exhaust systems converge and integrate inside said engine support, and exhaust gases are discharged through the interior of said oil pan following said convergence and integration.

2. An outboard engine exhaust structure as defined in claim 1, further comprising an exhaust collecting passage comprising two exhaust inlets located on said left and right sides and opened in the left and right side surfaces of said engine support, one central exhaust outlet located in said engine support, and exhaust ports extended toward the outside surfaces of said left and right cylinder heads; wherein said exhaust ports and said exhaust inlets are connected in communication by exhaust manifolds.

3. An outboard engine exhaust structure are defined in claim 2, wherein said exhaust inlets converge and integrate in the central portion of said engine support and communicate with said exhaust outlet opening part.

4. An outboard engine exhaust structure as defined in claim 2, wherein said exhaust inlet opening parts extend respectively in directions perpendicular to the axes of said left and right cylinders.

5. An outboard engine exhaust structure as defined in claim 3, wherein said exhaust inlet opening parts extend respectively in directions perpendicular to the axes of said left and right cylinders.

6. An outboard engine exhaust structure as defined in claim 2, wherein said exhaust inlets extend obliquely rearward as seen in a plan view.

7. An outboard engine exhaust structure as defined in claim 3, wherein said exhaust inlets extend obliquely rearward as seen in a plan view.

8. An outboard engine exhaust structure as defined in claim 4, wherein said exhaust inlets extend obliquely rearward as seen in a plan view.

9. An outboard engine exhaust structure as defined in claim 2, wherein a final exhaust passage that communicates with said exhaust outlet is located at the undersurface of said engine support and at about the central portion of said oil pan.

10. An outboard engine exhaust structure as defined in claim 3, wherein a final exhaust passage that communicates with said exhaust outlet is located at the undersurface of said engine support and at about the central portion of said oil pan.

11. An outboard engine exhaust structure as defined in claim 4, wherein a final exhaust passage that communicates with said exhaust outlet is located at the undersurface of said engine support and at about the central portion of said oil pan.

12. An outboard engine exhaust structure as defined in claim 5, wherein a final exhaust passage that communicates with said exhaust outlet is located at the undersurface of said engine support and at about the central portion of said oil pan.

13. An outboard engine exhaust structure as defined in claim 2, wherein the area surrounding said engine is covered by an engine cover, and wherein said exhaust manifolds are disposed inside triangular spaces defined by the outer surfaces of said crankcase, cylinder blocks, and cylinder heads and the inside of said engine cover.

14. An outboard engine exhaust structure in an outboard engine comprising:
    (a) a vertical type four-cycle V-type engine which has cylinder heads, cylinder blocks and a crankcase, and in which a V bank having a left and a right outer sides is formed between said cylinder blocks by disposing said cylinder blocks constituting an integral body on the left and right sides so as to define a V shape as seen in a plan view,
    (b) an intake system disposed inside said V bank,
    (c) exhaust systems disposed at said left and right outer sides of said V bank, and
    (d) a crankshaft disposed substantially vertically at the joint surface between said crankcase and said cylinder blocks;
    (e) an engine support adapted to be attached to a hull, above which said engine is disposed;
    (f) an oil pan disposed beneath said engine support; and
    (g) a final exhaust passage for discharging exhaust gas surrounded by a cooling water jacket and located in said oil pan;
    wherein said left and right exhaust systems converge and integrate inside said engine support, and said exhaust gas is discharged through said final exhaust passage.

15. An outboard engine exhaust structure as defined in claim 14, further comprising an exhaust collecting passage comprising two exhaust inlets located on said left and right sides and opened in the left and right side surfaces of said engine support, one central exhaust outlet located in said engine support, and exhaust ports extended toward the outside surfaces of said left and right cylinder heads; wherein said exhaust ports and said exhaust inlets are connected in communication by exhaust manifolds.

16. An outboard engine exhaust structure as defined in claim 15, wherein said exhaust inlets converge and integrate in the central portion of said engine support and communicate with said exhaust outlet opening part.

17. An outboard engine exhaust structure as defined in claim 15, wherein said exhaust inlet opening parts extend respectively in directions perpendicular to the axes of said left and right cylinders.

18. An outboard engine exhaust structure as defined in claim 16, wherein said exhaust inlet opening parts extend respectively in directions perpendicular to the axes of said left and right cylinders.

19. An outboard engine exhaust structure as defined in claim 15, wherein said exhaust inlets extend obliquely rearward as seen in a plan view.

20. An outboard engine exhaust structure as defined in claim 16, wherein said exhaust inlets extend obliquely rearward as seen in a plan view.

21. An outboard engine exhaust structure as defined in claim 17, wherein said exhaust inlets extend obliquely rearward as seen in a plan view.

22. An outboard engine exhaust structure as defined in claim 15, wherein said final exhaust passage communicates with said exhaust outlet and is located at the undersurface of said engine support at about the central portion of said oil pan.

23. An outboard engine exhaust structure as defined in claim 15, wherein:

the area surrounding said engine is covered by an engine cover;

said exhaust manifolds are disposed inside triangular spaces defined by the outer surfaces of said crankcase, cylinder blocks, and cylinder heads and the inside of said engine cover; and the top portions of said exhaust manifolds are connected to said exhaust ports of said cylinder heads.

24. An outboard engine exhaust structure as defined in claim 13, wherein the top portions of said exhaust manifolds are connected to said exhaust ports of said cylinder heads.

* * * * *